United States Patent [19]
Wu

[11] Patent Number: 5,346,006
[45] Date of Patent: Sep. 13, 1994

[54] OUTER CHAIN PLATE OF A BICYCLE DRIVE CHAIN

[75] Inventor: Nick Wu, Tainan, Taiwan

[73] Assignee: KMC Chain Industrial Co., Ltd., Tainan Hsien, Taiwan

[21] Appl. No.: 116,667

[22] Filed: Sep. 3, 1993

[51] Int. Cl.$^5$ ............................................. F16G 13/02
[52] U.S. Cl. ............................... 166/206; 166/212
[58] Field of Search ............ 474/206, 207, 212–217, 474/230–232; 59/82, 84, 85

[56] References Cited

U.S. PATENT DOCUMENTS

| | | | |
|---|---|---|---|
| 4,265,134 | 5/1981 | Dupoyet | 474/231 |
| 4,642,078 | 2/1987 | Dupoyet | 474/206 |
| 5,073,153 | 12/1991 | Wu | 474/206 |

Primary Examiner—Thuy M. Bui
Attorney, Agent, or Firm—Harness, Dickey & Pierce

[57] ABSTRACT

An outer chain plate for a bicycle drive chain includes an elongated plate body with upper and lower edges, two end portions formed with a respective hole, and a waist portion interconnecting the end portions. The plate body has an outer face which is formed with a generally S-shaped longitudinal recess that includes a straight connecting portion formed in the waist portion, and insert portions which are disposed on two ends of the straight connecting portion and which surround a respective one of the holes. The longitudinal recess has two open ends which extend respectively from the insert portions and which open in opposite directions toward a respective one of the upper and lower edges of the plate body. The plate body further has an inner face which is formed with a generally S-shaped longitudinal projection. The longitudinal projection has a shape that corresponds to that of the longitudinal recess and includes a connecting portion formed in the waist portion and two flat portions which are disposed on two ends of the connecting portion and which surround a respective one of the holes.

5 Claims, 6 Drawing Sheets

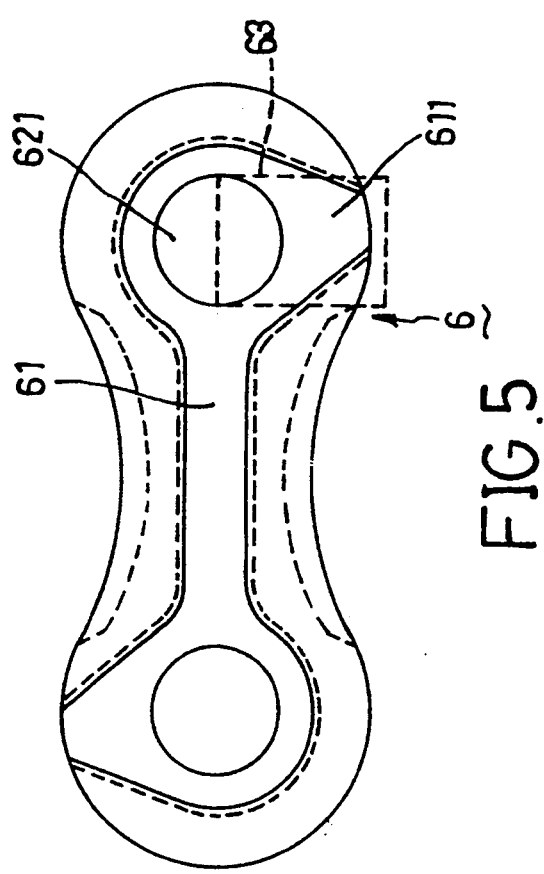
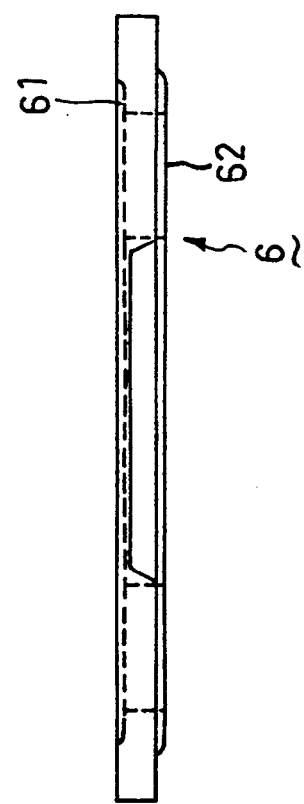
FIG.5
FIG.6

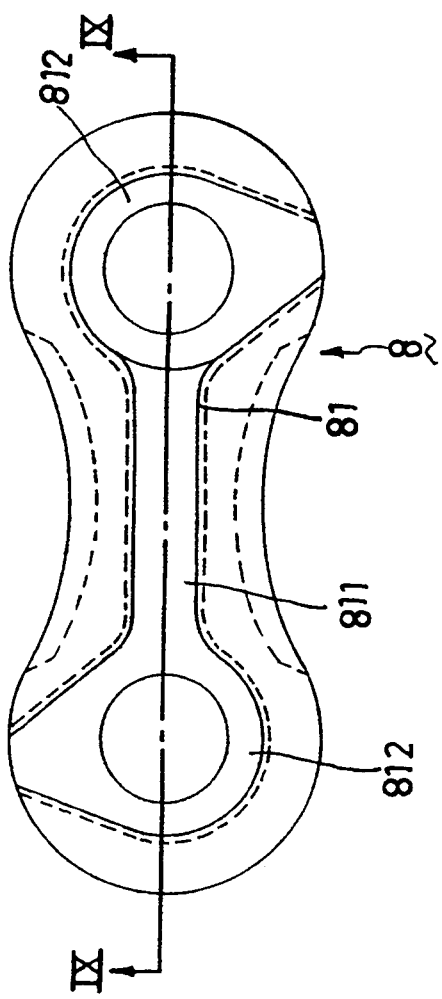
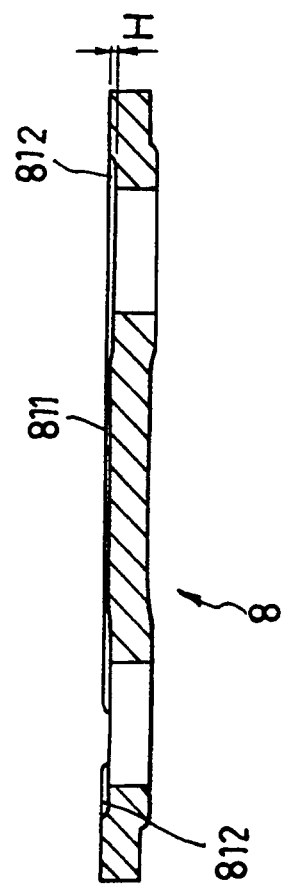

OUTER CHAIN PLATE OF A BICYCLE DRIVE CHAIN

BACKGROUND OF THE INVENTION

1. Field of the Invention

The invention relates to a bicycle drive chain, more particularly to an improved outer chain plate of a bicycle drive chain.

2. Description of the Related Art

The construction of a conventional bicycle drive chain has been modified continuously in order to achieve smoother operation of the bicycle transmission system and in order to facilitate shifting of the gear ratio. Ease of shifting of the gear ratio depends primarily on the construction of the outer chain plate of the bicycle drive chain. There are two important factors usually considered in the design of the outer chain plate. First, the outer chain plate should be designed so as to minimize friction between the outer chain plate and the sprocket wheels, thereby reducing the noise that is generated when the bicycle transmission system is in motion or when the gear ratio is being shifted. Second, the outer chain plate should be designed so as to facilitate engagement between the bicycle drive chain and the teeth of a selected sprocket wheel when the gear ratio is shifted.

The following are several examples of bicycle drive chain patents which have been granted in the United States:

U.S. Pat. Nos. 5,098,349 and 5,066,265 disclose a chain which includes inner and outer chain plates that have inclined surfaces along upper and lower edges of an inner face thereof. The inclined surfaces cooperatively form curved surfaces to facilitate sliding of a tooth of a sprocket into a space defined by either the inner or outer chain plates of the chain. U.S. Pat. No. 5,151,066 discloses a streamline chain which includes inner and outer chain plates that have inclined surfaces along upper and lower edges of an inner face thereof. As with the two previous patents, the inclined surfaces facilitate sliding of a tooth of a sprocket into a space defined by either the inner or outer chain plates of the streamline chain.

Note that the above three patents are directed to a bicycle drive chain which is capable of engaging smoothly the teeth of a selected sprocket wheel when the gear ratio is shifted.

In order to minimize friction between the outer chain plate and the sprocket wheels, U.S. Pat. No. 4,978,327 discloses a chain which includes an outer chain plate that is formed with a recess to receive one end of a pin therein, thereby preventing the pin from projecting relative to the outer surface of the outer chain plate so as to minimize the generation of friction. The same technique is applied in U.S. Pat. No. 4,983,147 to reduce the noise that is generated when the bicycle transmission system is in motion or when the gear ratio is being shifted.

Note that each of the above described conventional bicycle drive chains can satisfy only one of the aforementioned factors. Furthermore, both the inner and outer plates of the conventional bicycle drive chain are modified in order to satisfy said one of the aforementioned factors.

SUMMARY OF THE INVENTION

Therefore, the objective of the present invention is to provide an improved outer chain plate of a bicycle drive chain, the outer chain plate being designed so as to minimize the generation of noise and so as to facilitate smooth and proper engagement between the bicycle drive chain and the teeth of a selected sprocket wheel when the gear ratio is shifted.

Accordingly, the outer chain plate of the present invention includes an elongated plate body with upper and lower edges, two end portions formed with a respective hole, and a waist portion interconnecting the end portions. The plate body has an outer face which is formed with a generally S-shaped longitudinal recess that includes a straight connecting portion formed in the waist portion, and insert portions which are disposed on two ends of the straight connecting portion and which surround a respective one of the holes. The longitudinal recess has two open ends which extend respectively from the insert portions and which open in opposite directions toward a respective one of the upper and lower edges of the plate body. The plate body further has an inner face which is formed with a generally S-shaped longitudinal projection. The longitudinal projection has a shape that corresponds to that of the longitudinal recess and includes a connecting portion formed in the waist portion and two flat portions which are disposed on two ends of the connecting portion and which surround a respective one of the holes.

In an embodiment of the present invention, the open ends of the longitudinal recess narrow gradually from a respective insert portion to the respective one of the upper and lower edges of the plate body. Each of the open ends has a narrowest portion with a width that is less than a diameter of the respective one of the holes. The narrowest portion of each of the open ends is within a rectangular region that is bounded by a diameter of the respective one of the holes and the respective one of the upper and lower edges of the plate body.

BRIEF DESCRIPTION OF THE DRAWINGS

Other features and advantages of the present invention will become apparent in the following detailed description of the preferred embodiments, with reference to the accompanying drawings, of which:

FIG. 5 is a schematic view which illustrates the outer face of the second preferred embodiment of an outer chain plate according to the present invention;

FIG. 6 is a bottom view of the second preferred embodiment;

FIG. 8 is a schematic view illustrating the outer face of the third preferred embodiment of an outer chain plate according to the present invention; and FIG. 9 is a sectional view of the third preferred embodiment taken along line IX—IX in FIG. 8.

DETAILED DESCRIPTION OF THE PREFERRED EMBODIMENTS

Figure 1:
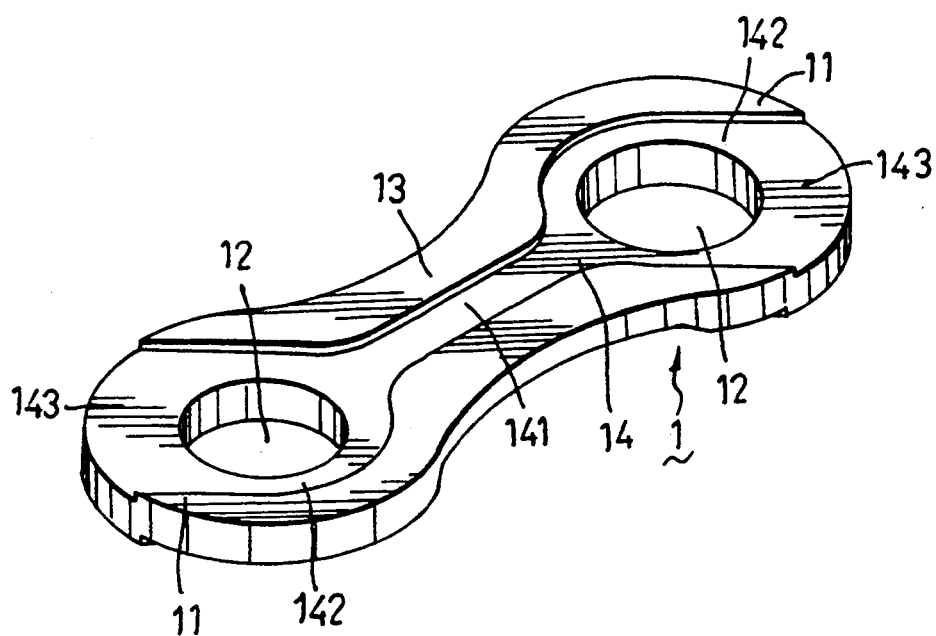
FIG. 1 is a perspective view illustrating the outer face of the first preferred embodiment of an outer chain plate according to the present invention.
Figure 2:
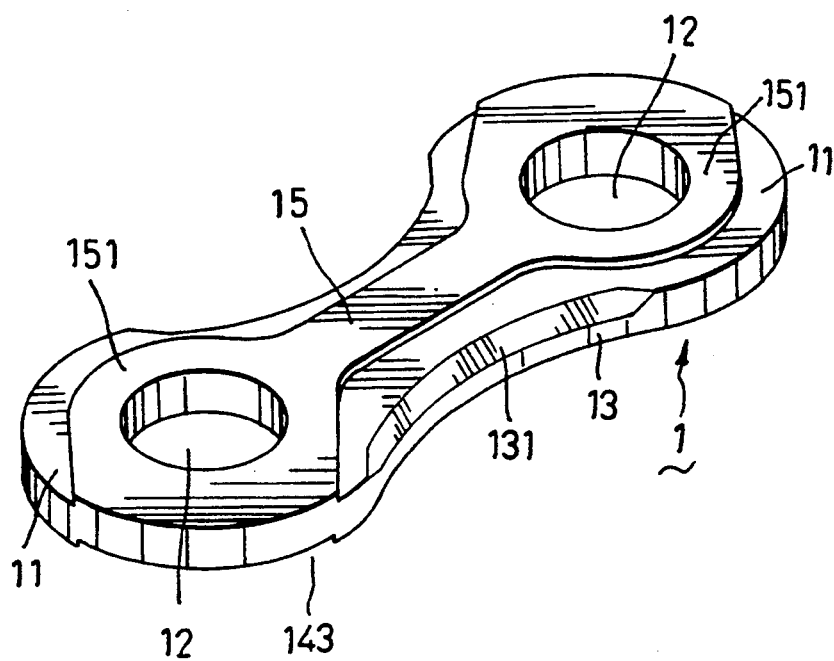
FIG. 2 is a perspective view illustrating the inner face of the first preferred embodiment.

Referring to FIGS. 1 and 2, the first preferred embodiment of an outer chain plate 1 according to the present invention is shown to be dumbbell-shaped and has two circular end portions 11 that are formed with a respective hole 12. The outer chain plate 1 further has a waist portion 13 which interconnects the circular end portions 11. The waist portion 13 has upper and lower curved edges that curve inwardly toward a longitudinal axis of the outer chain plate 1. The waist portion 13 further has an inclined surface 131 along the upper and lower curved edges on an inner face thereof.

The outer chain plate 1 has an outer face which is formed with a generally S-shaped longitudinal recess 14. The longitudinal recess 14 has a straight connecting portion 141 of constant width formed in the waist portion 13, and insert portions 142 which are disposed on two ends of the connecting portion 141 and which surround a respective one of the holes 12. The distance between a wall surface which confines one of the insert portions 142 and an inner wall surface which confines a corresponding one of the holes 12 is preferably maintained constant. The longitudinal recess 14 has two open ends 143 which extend respectively from the insert portions 142 and which open in opposite directions toward a respective one of the upper and lower edges of the outer chain plate 1.

The outer chain plate 1 further has an inner face which is formed with a generally S-shaped longitudinal projection 15. The shape of the longitudinal projection 15 corresponds to that of the longitudinal recess 14. Therefore, aside from a straight connecting portion formed in the waist portion 13, the longitudinal projection 15 has two flat portions 151 which are disposed on two ends of the connecting portion and which surround a respective one of the holes 12.

Figure 3:
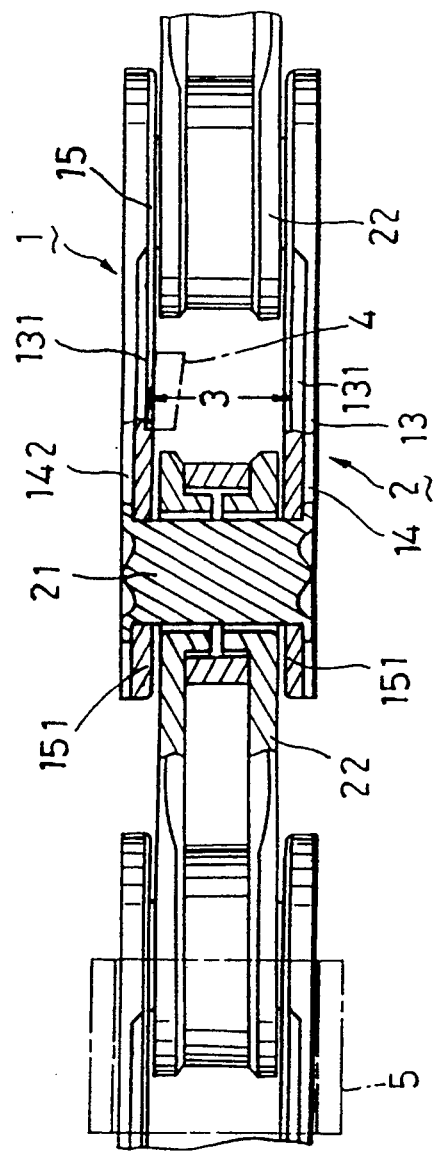
FIG. 3 is a partly sectional top view of a bicycle drive chain which incorporates the first preferred embodiment.
Figure 4:
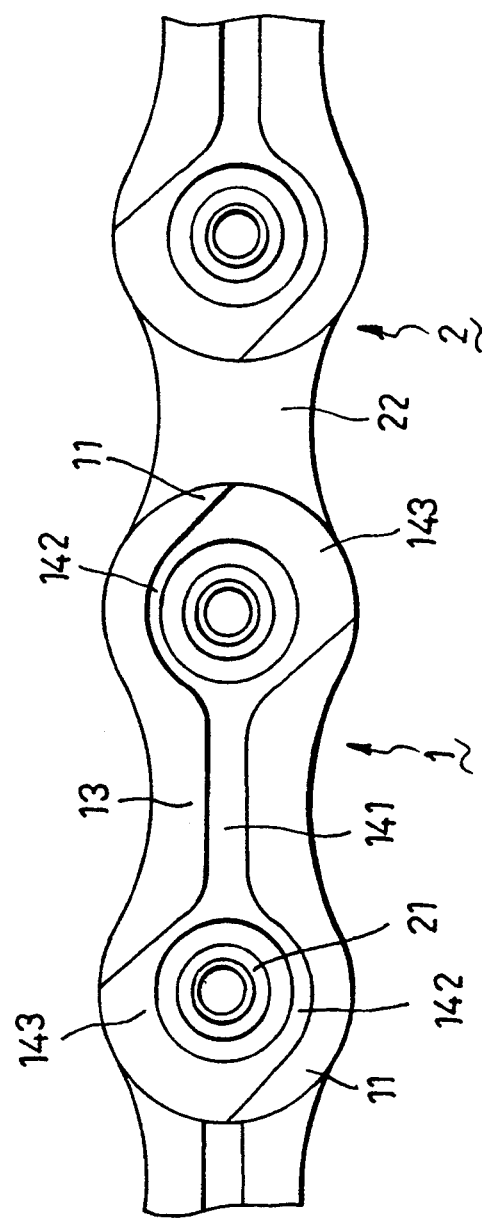
FIG. 4 is a front view of the bicycle drive chain which incorporates the first preferred embodiment.

FIGS. 3 and 4 illustrate the outer chain plate 1 when incorporated in a bicycle drive chain 2. Two outer chain plates 1 are disposed such that the inner faces thereof are spaced apart from each other. Pins 21 (only one pin 21 is shown) extend into the aligned holes 12 of the outer chain plates 1. The two ends of each pin 21 are deformed so as to be received in one of the insert portions 142 of the respective outer chain plate 1, thereby fastening the outer chain plates 1 together. The pins 21 are prevented from projecting relative to the outer faces of the outer chain plates 1 so as to minimize friction and reduce the generation of noise.

During assembly, the flat portions 151 of the longitudinal projection 15 on the outer chain plates 1 should form a clearance with the inner chain plates 22 of the bicycle drive chain 2. This permits ease of bending of the bicycle drive chain 2. Because the flat portions 151 project from the inner faces of the outer chain plates 1, the space 3 between the inner faces of the outer chain plates 1 is wider than that in a conventional bicycle drive chain to more easily accommodate a sprocket tooth 4 via the inclined surfaces 131 of the outer chain plates 1 when the gear ratio is shifted. Moreover, the configuration of the outer chain plate 1 facilitates engagement between the bicycle drive chain 2 and a derailleur 5 when the gear ratio is shifted.

When the bicycle drive chain is moved from a smaller sprocket wheel to a larger sprocket wheel during a gear-ratio shifting operation, a tooth of the larger sprocket wheel is usually supported on a lateral edge of the outer chain plate before the bicycle drive chain can engage properly the larger sprocket wheel. When the first preferred embodiment is used with certain brands of sprocket wheel clusters, it has been found that the tooth of the larger sprocket wheel is supported at the vicinity of the open ends 143 of the longitudinal recess 14. The teeth of some commercially available sprocket wheels are usually thin and tapered in order to facilitate smooth engagement between the bicycle drive chain and the sprocket wheels. Thus, if the first preferred embodiment is in use, skidding of the bicycle drive chain can occur since the tooth of the sprocket cannot be properly supported at the vicinity of the open ends 143 of the longitudinal recess 14. This condition occurs because the open ends 143 of the longitudinal recess 14 are relatively wide and have constant widths.

FIGS. 5 and 6 illustrate the second preferred embodiment of an outer chain plate 6 according to the present invention. The construction of the second preferred embodiment is substantially similar to that of the previous embodiment. Thus, the outer chain plate 6 also has an outer face which is formed with a generally S-shaped longitudinal recess 61 and an inner face which is formed with a generally S-shaped longitudinal projection 62. However, the open ends 611 of the longitudinal recess 61 narrow gradually from the respective insert portion to the respective one of the upper and lower edges of the outer chain plate 6. The width at a narrowest portion of the open ends 611 is less than the diameter of the holes 621 in the outer chain plate 6. Moreover, the narrowest portion of the open ends 611 is preferably within a rectangular region 63 that is bounded by a diameter of the respective hole 621 and one of the upper and lower edges of the outer chain plate 6.

Figure 7:
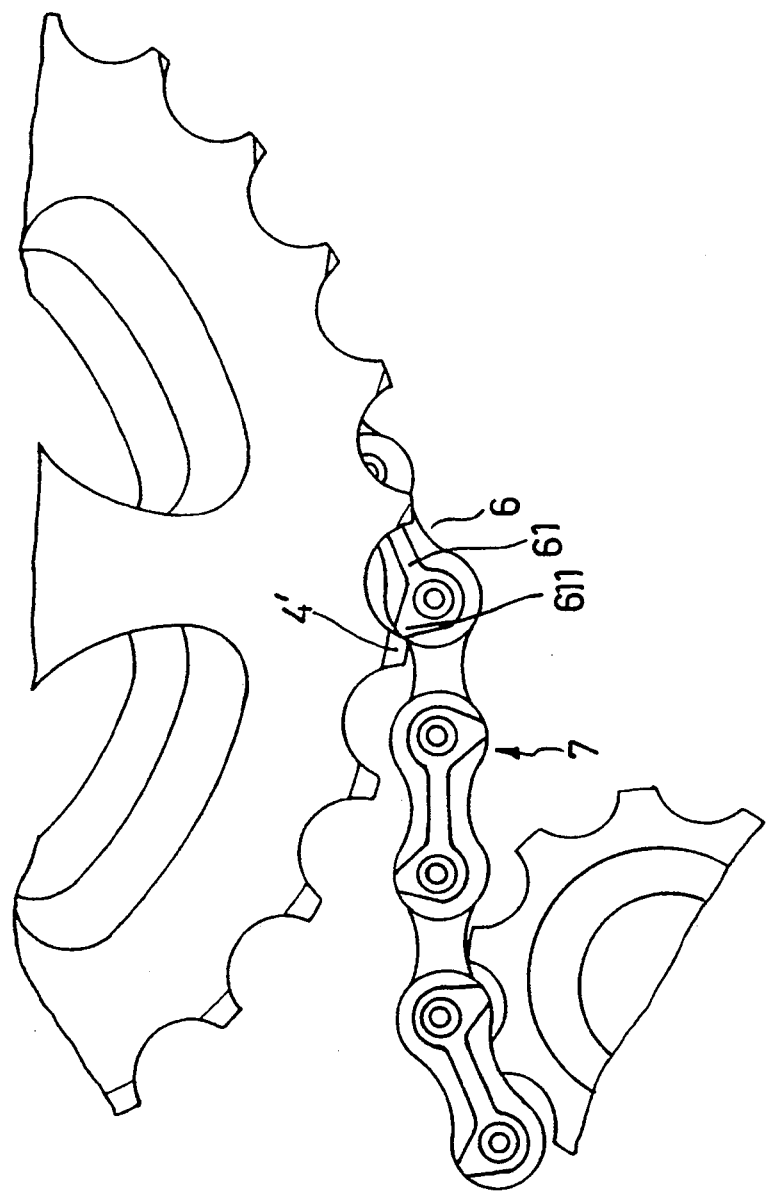
FIG. 7 illustrates a bicycle drive chain which incorporates the second preferred embodiment during a gear-ratio shifting operation.

Referring to FIG. 7, when a bicycle drive chain 7 which incorporates the outer chain plate 6 is moved during a gear-ratio shifting operation, the open ends 611 of the longitudinal recess 61 of the outer chain plates 6 prevent the tooth 4' of a sprocket from extending therein. Therefore, the outer chain plate 6 is capable of properly supporting the tooth on a lateral edge thereof. It has thus been shown that the modification introduced in the second preferred embodiment not only allows the second preferred embodiment to overcome the drawback of the previous embodiment, but also to meet the advantages of the latter.

FIGS. 8 and 9 illustrate the third preferred embodiment of an outer chain plate 8 according to the present invention. The third preferred embodiment is substantially similar to the second preferred embodiment. However, the depth of the connecting portion 811 of the longitudinal recess 81 is less than that of the insert portions 812, thereby forming a clearance (H) between the connecting portion 811 and the insert portions 812. The advantages and characterizing features of the third preferred embodiment are the same as those of the second preferred embodiment and will not be detailed further.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An outer chain plate of a bicycle drive chain, said outer chain plate including an elongated plate body with upper and lower edges, two end portions formed with a respective hole, and a waist portion interconnecting said end portions, said plate body having an outer face which is formed with a generally S-shaped longitudinal recess that includes a straight connecting portion formed in said waist portion, and insert portions which are disposed on two ends of said straight connecting portion and which surround a respective one of said holes, a wall surface confining one of said insert portions and an inner wall surface confining the respective one of said holes being displaced by a predetermined distance, said longitudinal recess having two open ends which extend respectively from said insert portions and which open in opposite directions toward a respective one of said upper and lower edges of said plate body, said plate body further having an inner face which is formed with a generally S-shaped longitudinal projection, said longitudinal projection having a shape that corresponds to that of said longitudinal recess and including a connecting portion formed in said waist portion and two flat portions which are disposed on two ends of said connecting portion and which surround a respective one of said holes.

2. The outer chain plate of a bicycle drive chain as claimed in claim 1, wherein said open ends of said longitudinal recess narrow gradually from a respective said insert portion to the respective one of said upper and lower edges of said plate body, each of said open ends having a narrowest portion with a width that is less than a diameter of the respective one of said holes.

3. The outer chain plate of a bicycle drive chain as claimed in claim 2, wherein said narrowest portion of each of said open ends is within a rectangular region that is bounded by a diameter of the respective one of said holes and the respective one of said upper and lower edges of said plate body.

4. The outer chain plate of a bicycle drive chain as claimed in claim 1, wherein said straight connecting portion of said longitudinal recess has a depth which is less than that of said insert portions.

5. The outer chain plate of a bicycle drive chain as claimed in claim 1, wherein said waist portion has upper and lower curved edges that curve inwardly toward a longitudinal axis of said plate body, said waist portion further having an inclined surface along said upper and lower curved edges on said inner face of said plate body.

* * * * *